United States Patent [19]

Weiner

[11] Patent Number: 4,820,233

[45] Date of Patent: Apr. 11, 1989

[54] SOUND-PRODUCING AMUSEMENT DEVICES

[76] Inventor: Avish J. Weiner, 39 Yehuda Hanasi Street, Ramat-Aviv, Tel-Aviv, Israel

[21] Appl. No.: 3,040

[22] Filed: Jan. 13, 1987

[30] Foreign Application Priority Data

Jan. 26, 1986 [IL] Israel .................................. 77705
Jan. 2, 1987 [IL] Israel .................................. 81146

[51] Int. Cl.$^4$ .......................... A63H 3/28; A63H 5/00
[52] U.S. Cl. .................................... 446/303; 446/397; 434/308
[58] Field of Search ............... 446/297, 397, 303, 301, 446/300, 298; 434/308, 340, 169

[56] References Cited

U.S. PATENT DOCUMENTS

| 3,553,851 | 1/1971 | Paige . | |
| 3,641,684 | 2/1972 | Paige . | |
| 3,744,150 | 7/1973 | Folson . | |
| 3,808,720 | 5/1974 | Smith | 40/28.3 |
| 4,348,191 | 9/1982 | Lipsitz et al. | 434/308 |
| 4,389,639 | 6/1983 | Torii et al. | 340/539 |
| 4,425,098 | 1/1984 | Doring | 434/317 |
| 4,516,950 | 5/1985 | Berman et al. | 446/297 |
| 4,521,205 | 6/1985 | Spector | 446/302 |
| 4,636,881 | 1/1987 | Brefka et al. | 360/74.1 |

FOREIGN PATENT DOCUMENTS 2572300  5/1986  France ................................ 446/297

OTHER PUBLICATIONS

"Speak & Spell", Synthetic Speech, Popular Science, p. 153, Mar. 1979.

Primary Examiner—Mickey Yu

[57] ABSTRACT

A sound-producing amusement device, having: a read-only memory having recorded therein digital data representing sounds characteristic of the amusement device, and sound-producing unit for producing the sounds represented by the digital data recorded in the read-only memory. The read-only memory is in a separate unit including connectors for connection to the sound-producing unit. The sound-producing unit includes mating connectors for removably attaching and electrically connecting the sound-producing unit to the read-only memory unit, a battery for supplying power to both the sound-producing unit and the read-only memory unit, and a speaker for producing the sounds represented by the data stored in the read-only memory unit.

1 Claim, 4 Drawing Sheets

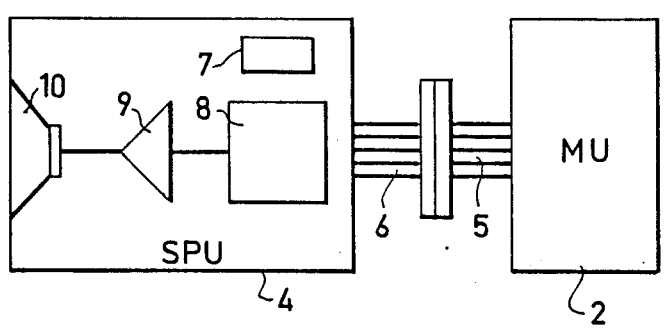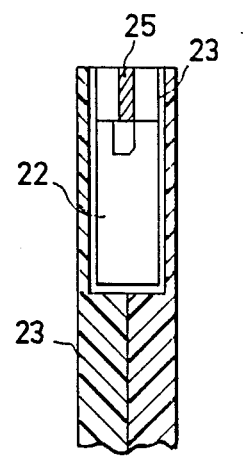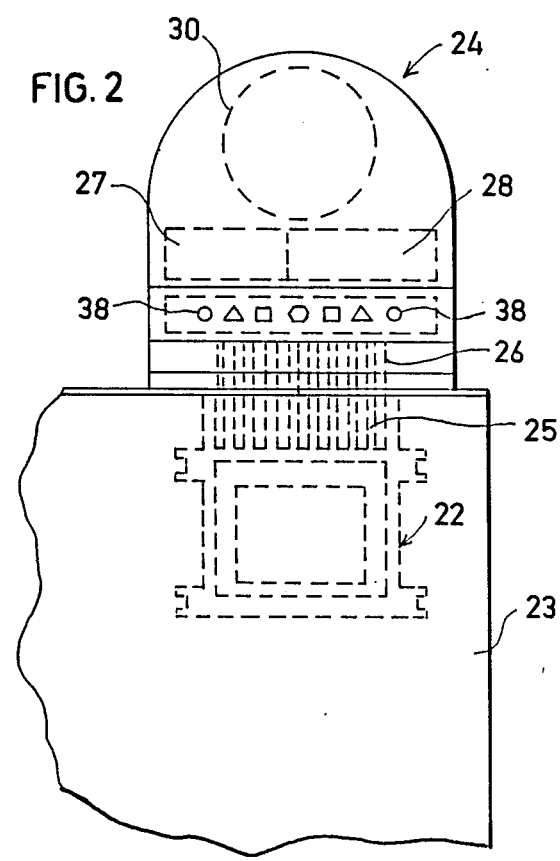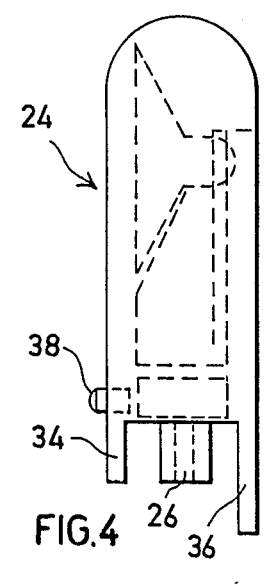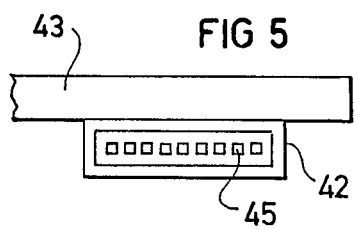

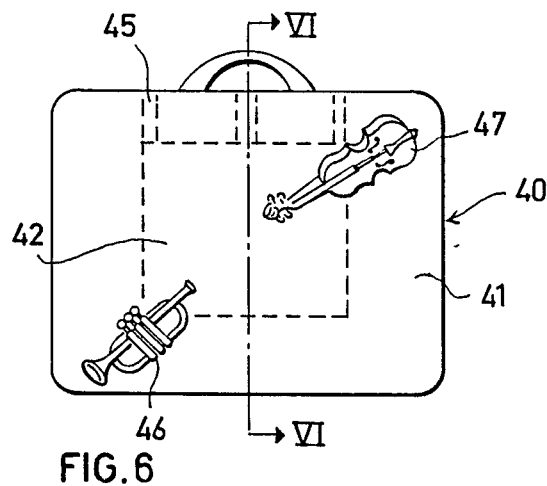
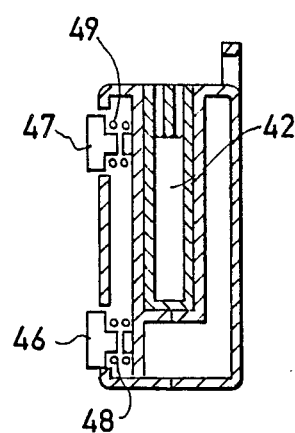
FIG.6    FIG.7
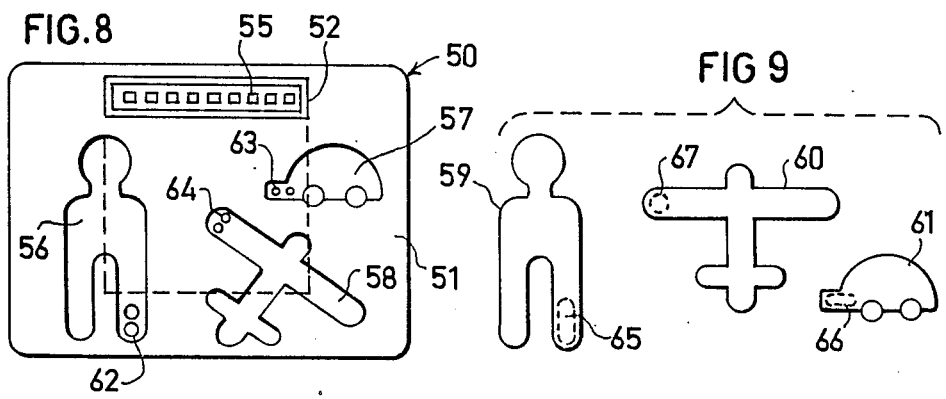
FIG.8    FIG 9
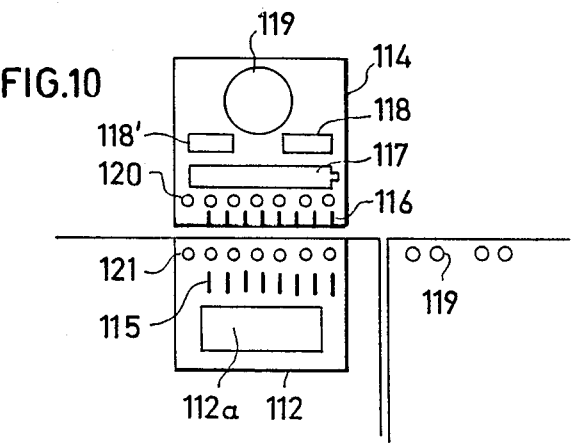
FIG.10

SOUND-PRODUCING AMUSEMENT DEVICES

BACKGROUND OF THE INVENTION

The present invention relates to sound-producing amusement devices, such as talking books, talking toys, talking dolls, and the like.

A number of sound-producing amusement devices have been developed. In the older devices, the sounds were prerecorded in analogue form, for example on a disc or tape; but in the newer devices they are recorded in digital form, for example in a read-only memory. Each such device includes not only the memory, but also a sound-producing unit, both designed for each specific amusement device. Such sound-producing devices are therefore relatively expensive. Moreover, the sounds produced by each device are limited and usually cannot be conveniently modified.

An object of the present invention is provide sound producing amusement devices having advantages in The above respects.

SUMMARY OF THE INVENTION

According to the present invention, there is provided a sound-producing amusement device comprising a read-only memory having recorded therein digital data representing sounds characteristic of the amusement device, and sound-producing means for producing the sounds represented by the digital data recorded in the read-only memory; characterised in that the read-only memory is in a separate unit including connectors for connection to the sound-producing means; and in that the sound-producing means is a separate unit including mating connectors for removably attaching and electrically connecting the sound-producing unit to the read-only memory unit, the sound-producing unit further including means for holding a battery power supply for supplying power to both the sound-producing unit and the read-only memory unit when attached thereto, and a transducer for producing the sounds represented by the data stored in the read-only memory unit.

Such an amusement device provides a number of advantages over the conventional constructions. Thus, the read-only memory unit may be specifically designed for the particular amusement device to which it is to be attached, whereas the sound-producing unit may be of a standard design useful with many different amusement devices of the same kind (e.g., talking books) or of different kinds (e.g., talking books, talking toys, talking dolls). In addition, almost any type of amusement device, such as a book, toy or doll, can be conveniently, and relatively inexpensively, converted to a talking device by merely attaching thereto a read-only memory unit having recorded therein digital data representing sound characteristics of the specific amusement device. The sound producing unit, although relatively expensive because it includes most of the components of the talking part of the device, may be used for many different amusement devices; therefore, once the user has purchased a sound producing unit, he can use the same unit for many different devices. Further, the recorded message for the respective amusement device can be easily changed by merely removing the read-only memory unit and attaching another one having the new message recorded therein which new message will be reproduced by the original sound-producing unit.

BRIEF DESCRIPTION OF THE DRAWINGS

The invention is herein described, by way of example only, with reference to the accompanying drawings, wherein:

FIG. 1 is a block diagram helpful in explaining the electrical circuit in the sound-producing devices described herein;

FIG. 2 illustrates a talking book constructed in accordance with the present invention;

FIG. 3 is a sectional view of a portion of the talking book of FIG. 2 showing one manner of incorporating the read-only memory unit;

FIG. 4 is a side elevational view illustrating the sound-reproducing unit used in the talking book of FIG. 2;

FIG. 5 is a top plan view illustrating another manner of attaching the read-only memory unit to the book;

FIG. 6 illustrates another sound-producing amusement device in accordance with the invention;

FIG. 7 is a sectional view along lines VI—VI of FIG. 6;

FIG. 8 illustrates a further sound-producing device in accordance with the invention;

FIG. 9 illustrates the removable figures for use with the device of FIG. 8;

FIG. 10 is a fragmentary view illustrating a talking book including automatic means for selecting the recorded sounds to correspond to a selected one of the book pages;

DESCRIPTION OF PREFERRED EMBODIMENTS

Figure 11:
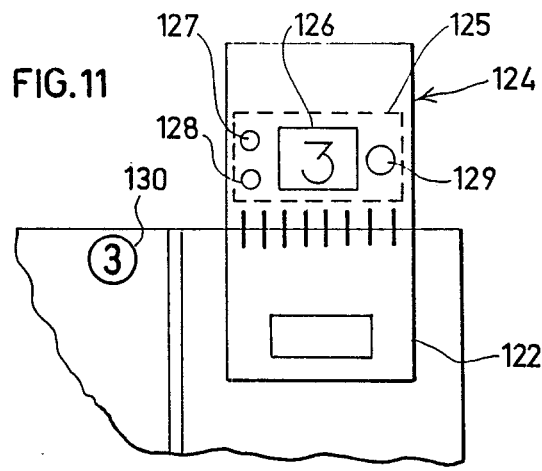
FIG. 11 is also a fragmentary view illustrating a talking book but having other means for selecting the recorded sounds.

Reference is first made to the block diagram of FIG. 1 pictorially illustrating the division of the electrical circuit between the read-only memory unit 2 and the sound-producing unit 4. The read-only memory unit 2 is a separate unit which, in most cases, is fixedly attachabled to the amusement device, and includes connectors 5 for connection to the sound-producing unit 4. Similarly, the sound-producing unit 4 is a separate unit and includes its own connectors 6 for removably attaching to, and electrically connecting, the sound-producing unit 4 to the read-only memory unit 2.

The read-only memory unit 2 includes only the digital data representing the sounds of the amusement device to which it is attached; optionally, it may also include digital data representing controls to be applied to the amusement device. On the other hand, the sound-producing unit 4 includes all the other components necessary to reproduce the sounds recorded, including a holder 7 for a battery, circuitry 8, e.g., a central processor unit, for processing the data, and a transducer 10, e.g., a speaker for reproducing the sounds recorded in the memory unit 2.

FIGS. 2-4 illustrate the invention applied to a talking book, in which read-only memory unit 22 is fixedly attached to the book cover 23, and a sound-producing unit 24 is mechanically and electrically connectible to unit 22. For this purpose, unit 22 is received within a recess 23' (FIG. 3) formed in the upper edge of the book cover 23, with the connectors 25 of unit 22 disposed for connection to connectors 26 of the sound-producing unit 24 when the latter is inserted into recess 23'. As described with respect to FIG. 1, the sound-producing unit 24 includes all the components necessary to reproduce the sounds recorded in unit 22, including: a holder 27 for the battery for supplying both units 22 and 24, the processing circuitry 28 for processing the data stored in unit 22, and a speaker 30 for producing the sounds stored in unit 22.

The sound-producing unit 24 further includes a pair depending stems 34, 36, (FIG. 4) which are engageable with the opposite faces of the book cover 23 when the unit is inserted into recess 23' of the book cover with connector 26 of unit 24 in electrical contact with connector 25 of unit 22. This arrangement stably supports the sound-producing unit 24 on the upper edge of the book cover.

The sound-producing unit 24 further includes a plurality of pushbuttons 38 of different geometrical configurations. These configurations conform to symbols marked on each page of the book, so that the user may depress the pushbutton having the same configuration as a symbol marked on any particular page in order to select and play back the sound recorded in unit 22 for the respective page.

FIG. 5 illustrates a variation, wherein the read-only memory unit 42, is attached to the outer face of the book cover 43, rather than being received within a recess formed in the book cover. The connectors 45 of unit 42 face upwardly, as in the previously described embodiment, for engagement with the connectors of the sound-producing unit when the latter is attached to the memory unit. The arrangement illustrated in FIG. 5 obviates the need for making any changes in the construction of the book covers, since the memory unit 22 may be conveniently attached to the outer face of any book cover.

FIGS. 6 and 7 illustrate the amusement device embodied in the form of a toy including a base 41 having incorporated therein a read-only memory unit 42 provided with connectors 45 along an edge adapted to receive a sound-producing unit (not shown), as in the previously described embodiments. Base 41 of the toy supports a plurality of different items, in this case musical items, namely a horn 46 and a violin 47; and the read-only memory unit 42 would have recorded therein digital data representing the sounds of the different instruments. Each of the items 46, 47 constitutes an electrical which is normally open under the action of a spring 48, 49, but which switch is closed when that item is touched by the user. Thus, when the user touches the horn 46, he closes switch 48 which thereby selects the digital data recorded in unit 42 representing the sounds of the selected horn, and these sounds are reproduced by the sound-producing unit. If violin 47 is touched, its switch 49 is closed, and the sounds representing a violin are selected and reproduced.

FIGS. 8 and 9 illustrate another type of talking toy, generally designated 50, also including a base 51 incorporating a read-only memory unit 52 provided with a plurality of contacts 55 exposed along an outer face of the base for receiving the contacts of a sound-producing unit (not shown). Base 51 of the toy 50 is formed with a plurality of sockets 56, 57, 58 each of a configuration for receiving one of a plurality of FIGS. 59, 60, 61 of the same configuration as the respective sockets. Each socket is further provided with a pair of contacts 62, 63, 64, and each figure 59-61 is provided with an electrical contact 65, 66, 67, such that when the proper figure is inserted into the proper socket, the electrical contact on the figure bridges the two contacts in the respective socket.

Thus, when the user inserts the proper figure into the proper socket (e.g., FIG. 59 into socket 56), the electrical contacts (65) on the figure bridges the two contacts (62) in the socket, and thereby selects a message recorded in the read-only memory unit 52 corresponding to the inserted figure, which recorded message is played back by the sound-reproducing unit (not shown) attached to connectors 55 of the memory unit.

FIG. 10 illustrates a talking book of the type illustrated in FIGS. 2–5. It includes a read-only memory unit 112 in the form of a board or card mounted, as by fasteners (not shown), to the outer face at the upper end of one of the covers of the book as illustrated in FIG. 5, so that its connectors 115 are exposed adjacent to the upper edge of the book cover. The sound-producing unit 114 is removably attachable to the upper edge of the cover with connectors 116 of unit 114 in contact with connectors 115 of unit 112 to establish an electrical connection between the two units. As also in the embodiments illustrated in FIGS. 2–5, unit 112 includes a read-only memory chip 112a having recorded therein the digital data representing spoken words or other sounds corresponding to the contents of the book, and unit 114 includes all the other required components, including a battery holder 117, a CPU 118, an amplifier 118', and a speaker 119, for processing the digital data and for reproducing it in the form of spoken words or other sounds.

However, as distinguished from the embodiments of the invention illustrated in FIGS. 2–5, the embodiment illustrated in FIG. 10 includes means for automatically selecting the recorded data to be reproduced according to the page to which the book is turned. For this purpose, unit 114 is formed with a linear array of light-sensitive diodes 120, and unit 112 is formed with a corresponding linear array of holes 121 alignable with diodes 120. In the described example, there are seven diodes 120 and seven holes 121, thereby enabling them to represent any number from 1 to 7. The illustrated arrangement can therefore be used with a book having up to 7 pages, with a spoken word message recorded in the read-only memory unit 112 for each one of these pages. Each of these different recorded messages is automatically selected by the holes 119 formed in the upper part of each page arranged so that when that page is turned to overlie the light-sensitive diodes 120 of unit 114, that page, together with the underlying pages, will expose to light those diodes representing the page to be read.

Thus, in the arrangement illustrated in FIG. 10, when the user, such as a small child, merely turns to the proper page, the coded arrangement of holes 119 on that page, as well as in the underlying page between it and unit 112, will identify the respective page number and will thereby select the recorded message for that particular page for reproduction by the sound-producing unit 114.

FIG. 11 illustrates a talking book of the type illustrated in FIG. 10, but for use by an older child, i.e., one who can recognize the page number and then manually operate the sound-producing unit, therein designated 124, to select the message recorded in the read-only memory unit 122 allocated to that respective page. For this purpose, the sound-producing unit 124 is provided with a multiple-position digital switch 125 including a display 126 for displaying the position of the switch, an up-stepper button 127 for up-stepping the digital switch and its display 126, and a down-stepper button 128 for down-stepping the digital switch and its display. Switch 125 further includes an actuator button 129 which is to be depressed after the switch has been incremented to its proper position to correspond to the number 130 printed on the respective page of the book.

Thus, in the arrangement illustrated in FIG. 11, the memory unit 122 may include digital data representing a message for each of the pages of the book. These messages can be manually selected by the user by merely incrementing switch 125 until its display 126 matches the number or symbol for the respective page, and then depressing actuator button 129.

The talking books illustrated in FIGS. 2 and 3 could be modified so that the sounds recorded in the memory unit are automatically reproduced page after page, starting from the first page, unless or until the user intervenes. The arrangement illustrated in FIG. 11 could be modified to omit the actuator button 129, such that the reproduction of the sounds is automatically effected after the elapse of a predetermined time interval following the selection of the page.

Figure 12:
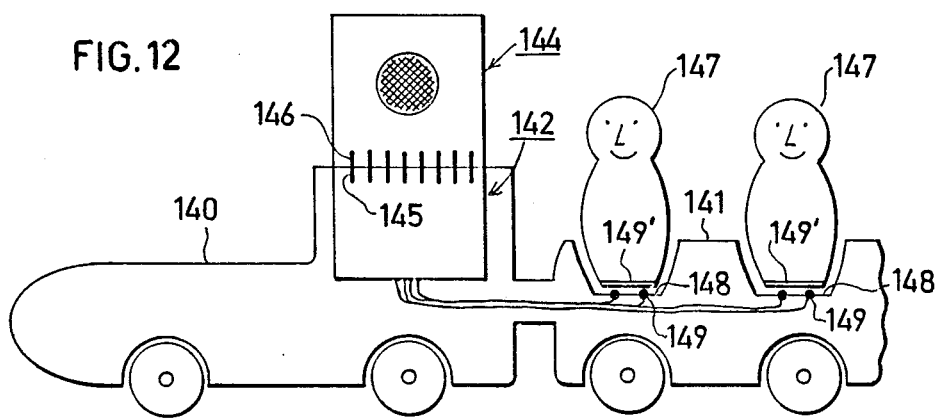
FIGS. 12 and 13 illustrate two other forms of talking toys in accordance with the invention.

FIG. 12 illustrates the invention applied to a talking toy, in the form of a train having an engine 140 and one or more cars 141. The read-only memory unit 142 is fixedly attached to the engine 140 so as to enable the attachment of the sound-producing unit 144 via the connectors 145 and 146 of the two units. In the example illustrated in FIG. 12, the car 141 is adapted to received two figures toy 147, e.g., simulating residents of different countries. In such a case, the read-only memory unit 142 would have two different recorded messages, each pertaining to the two different toy FIGS. 147 which may be inserted in car 141. Car 141 is formed with two sockets 148, one for each of the two toy FIGS. 147. The base of each socket is provided with a pair of electrical contacts 149, each pair being electrically connected to the memory unit 142. In addition, the base of each toy FIG. 147, is provided with an electrical conductor 149' adapted to bridge the electrical contacts of the respective socket when the figure is inserted into that socket.

Thus, when one FIG. 147 is inserted into a socket 148, electrical conductor 149' on the base of the inserted FIG. 147 bridges contacts 149 of the respective socket, and thereby selects the message recorded in unit 142 pertaining to that figure. In each case, the reproduction of the message recorded in unit 142 is effected by the sound-producing unit 144 which includes all the necessary components for this purpose.

Figure 13:
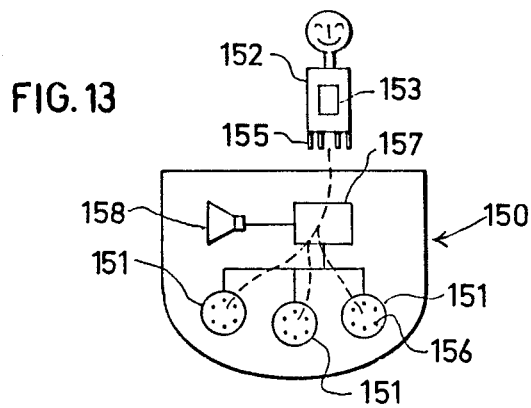

FIG. 13 illustrates another talking toy, including a holder 150 formed with one or more sockets 151 (three being shown) for receiving any one of a plurality of toy FIGS. 152, one of which is shown in FIG. 13. Holder 150 constitutes the sound-producing unit, and includes the power supply, processing circuitry schematically shown at 157, and speaker 158. Each of the toy FIGS. 152 includes a memory unit 153 and connectors 155 mating with connectors 156 in each socket 151, such that when each toy figure is inserted into a socket, the sounds recorded in the memory unit 153 of the respective figure are automatically reproduced from the speaker 158 in the holder 150.

Figure 14:
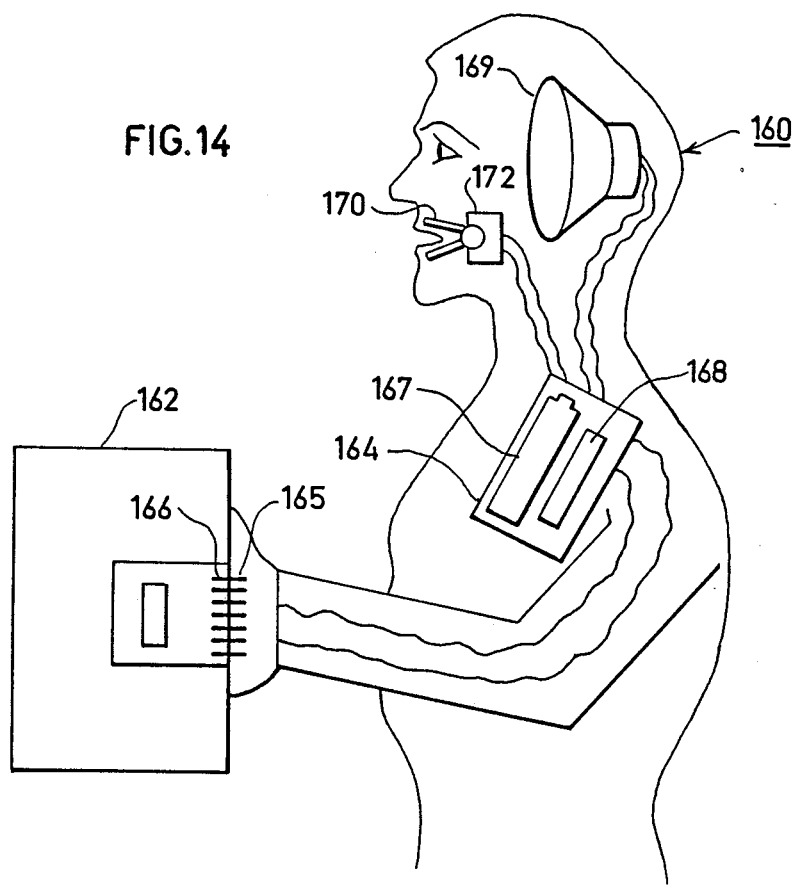
FIG. 14 illustrates a talking doll in accordance with the invention.

FIG. 14 illustrates the invention implemented in a talking doll, generally designated 160. In this case, the talking doll 160 includes the sound-producing unit and all the elements necessary for reproducing the sounds, except for the recorded digital data representing the sounds to be produced by the doll; the latter data is recorded in the read-only memory unit 162 connectible to the sound-reproducing unit 164 via connectors 165 and 166. In this embodiment, the read-only memory unit 162 may be in the form of a simple card which is insertable into sockets formed in the hand or other part of the doll representing the sound-reproducing unit 164; the latter unit, as in the earlier described embodiments, includes a holder 167 for the battery, all the necessary circuitry 168 for processing and amplifying the digital data received from unit 162, and a speaker 169 for reproducing the sounds recorded in unit 162.

In addition, the sound-producing unit 164, namely the body of the doll, may also include movable parts, such as lips 170, and a motor 172 for moving them. The control data for controlling motor 172 in order to move the doll's lips 170 is also stored in digital form in the read-only memory unit 162, so that this digital data is also spoken by the talking doll 164 at the same time the message recorded in unit 162 is outputted to the talking doll. The control of motor 172 is coordinated with the spoken message so that the lips 170 of the doll are moved to simulate the movement of the doll's lips with the words spoken by the doll.

Figure 15:
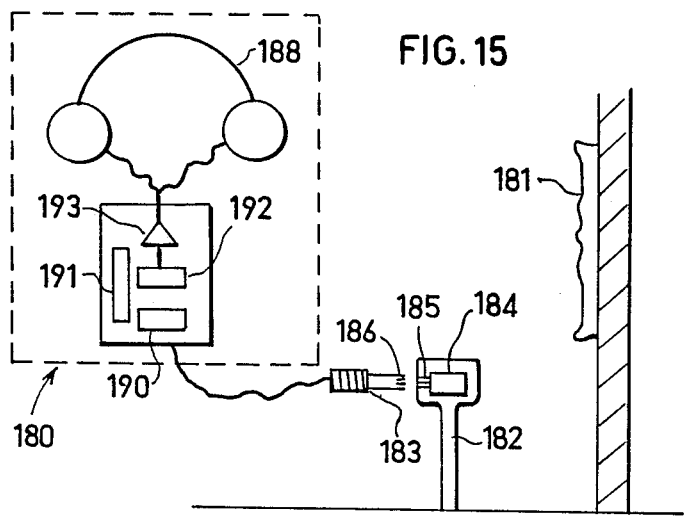
FIG. 15 illustrates a talking display, such at a museum, in accordance with the invention.

FIG. 15 illustrates a still further embodiment of the invention in the form of a display, such as at a museum or the like. In this embodiment, a sound message is to be reproduced in a set of earphones 180 corresponding to the picture, statue, exhibition or other device 181 being displayed.

In this case, the display includes a fixed member 182, such as a guard rail, to which may be attached the sound-producing unit 180 by means of a plug 183. The sound-producing unit 180 includes all the components necessary to reproduce the sound messages. The latter messages are recorded in the read-only memory unit 184 fixedly or removable received in the fixed member 182. The read-only memory unit 184, and the plut of the sound-producing unit 180, include the two groups of connectors 185 and 186, respectively, which connect the read-only memory unit 184 to the sound-producing unit for processing the digital data recorded in unit 184 and to be reproduced in headphones 188 included in the sound-producing unit 180.

Preferably, the sound-producing unit 180 further include a RAM (Random-Access-Memory) unit 190 into which is loaded the digital data from the read-only memory (ROM) unit 184 representing the sounds to be reproduced. Thus, RAM unit 190 serves as a buffer which may be quickly loaded with the digital data upon plugging into unit 184, enabling many users to quickly load their respective unit, while the message in each unit is reproduced at the normal rate for listening by the user. Unit 180 further includes a battery holder 191, a CPU 192, and an amplifier 193 for converting the recorded data into sounds in the headphones 187.

In all the described embodiments, the memory unit is described as a read-only memory unit (ROM), but it will be appreciated this includes the variations of such units, namely PROM's, EPROM's, EEPROM's etc.

While the invention has been described with respect to a number of embodiments, these are set forth merely for purposes of example, and many other variations, modifications and applications of the invention may be made.

What is claimed is:

1. A talking toy comprising a plurality of toy figures; and a holder formed with a plurality of like sockets each for receiving any one of said toy figures; each of said toy figures including a read-only memory unit having recorded therein digital data representing sounds characteristic of the respective toy figure, and connectors for connection to one of the sockets of said holder; said holder including a transducer for reproducing the sound represented by the data stored in the read-only memory unit of the toy figures inserted in its sockets, and a battery supply for supplying power to both the transducer of the holder and the memory unit of each toy received in one of its sockets.

* * * * *